United States Patent

Livingston et al.

[11] Patent Number: 5,377,793
[45] Date of Patent: Jan. 3, 1995

[54] SLEEVE FOR A DRUM BRAKE ADJUSTER SCREW

[75] Inventors: Alan G. Livingston, Huber Heights; Michael W. Fanelli, Centerville, both of Ohio

[73] Assignee: General Motors Corporation, Detroit, Mich.

[21] Appl. No.: 174,087

[22] Filed: Dec. 28, 1993

[51] Int. Cl.⁶ .................. F16D 51/20; F16B 37/14
[52] U.S. Cl. .................. 188/331; 188/78; 411/373
[58] Field of Search .......... 188/78, 325, 331, 196 B, 188/196 BA; 403/60, 61, 136, 147, 223, 315, 317; 411/373, 429

[56] References Cited

U.S. PATENT DOCUMENTS

| | | | |
|---|---|---|---|
| 2,775,315 | 12/1956 | Maruhn et al. | 188/331 |
| 3,357,527 | 12/1967 | Bauman et al. | 188/79.56 |
| 3,375,907 | 4/1968 | Moyer | 188/76 |
| 3,744,595 | 7/1973 | Adams | 188/331 |
| 3,949,845 | 4/1976 | Newstead et al. | 188/331 |
| 4,026,394 | 5/1977 | Wright | 188/331 |
| 4,061,429 | 12/1977 | Mathues | 188/206 A |
| 4,132,488 | 1/1979 | Strong | 403/60 |
| 4,400,123 | 8/1983 | Dunegan | 411/373 |

FOREIGN PATENT DOCUMENTS 0254606  1/1988  France .................. 188/78

Primary Examiner—Robert J. Oberleitner
Assistant Examiner—Chris Schwartz
Attorney, Agent, or Firm—A. Michael Tucker

[57] ABSTRACT

An automotive drum brake assembly includes first and second brake shoes mounted on a backing plate. A wheel cylinder for braking actuation is mounted between the brake shoes. An adjuster screw assembly is held between the brake shoes by an adjuster spring. The adjuster screw assembly includes a pivot nut threaded onto an adjuster screw. In one embodiment, a sleeve includes a first portion slidably mounted on the pivot nut, a second ramp portion covering the screw threads and a third portion opposite the pivot nut. The second portion, preferably formed as a frustoconical ramp, is slid by the adjuster spring to travel with the adjuster screw as it unthreads from the pivot nut, thereby shielding threads from corrosive elements.

18 Claims, 2 Drawing Sheets

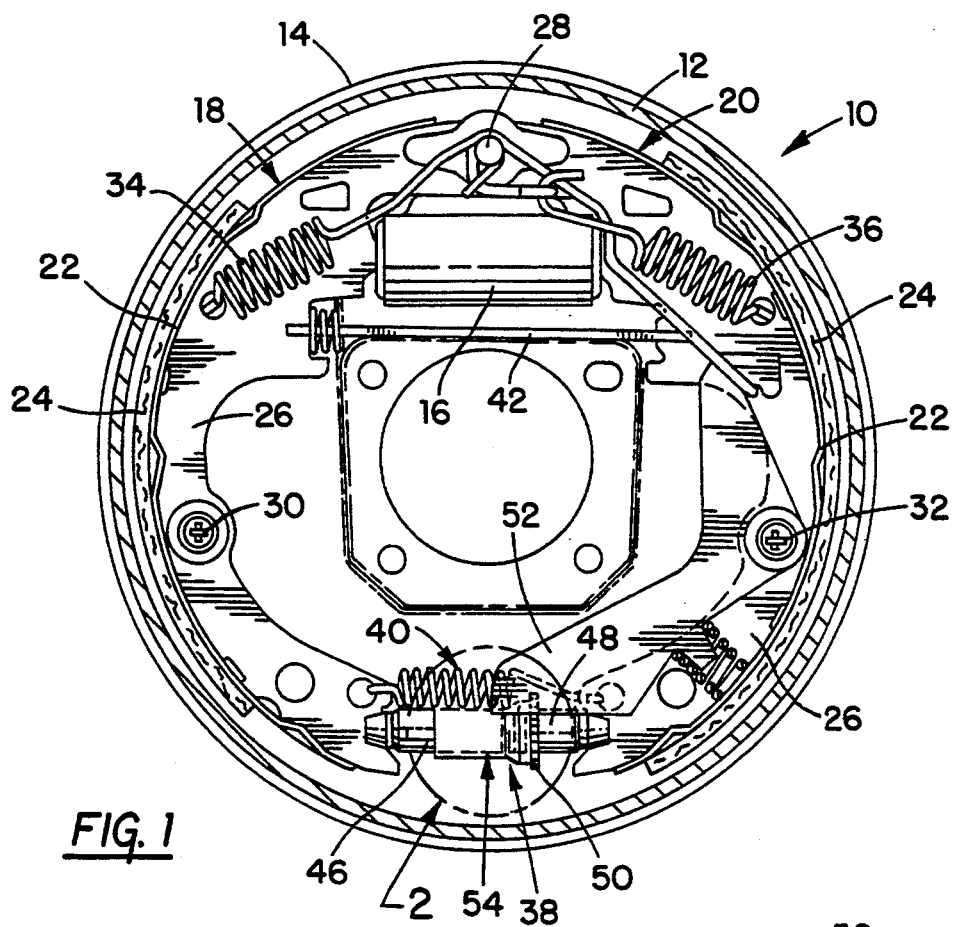
FIG. 1
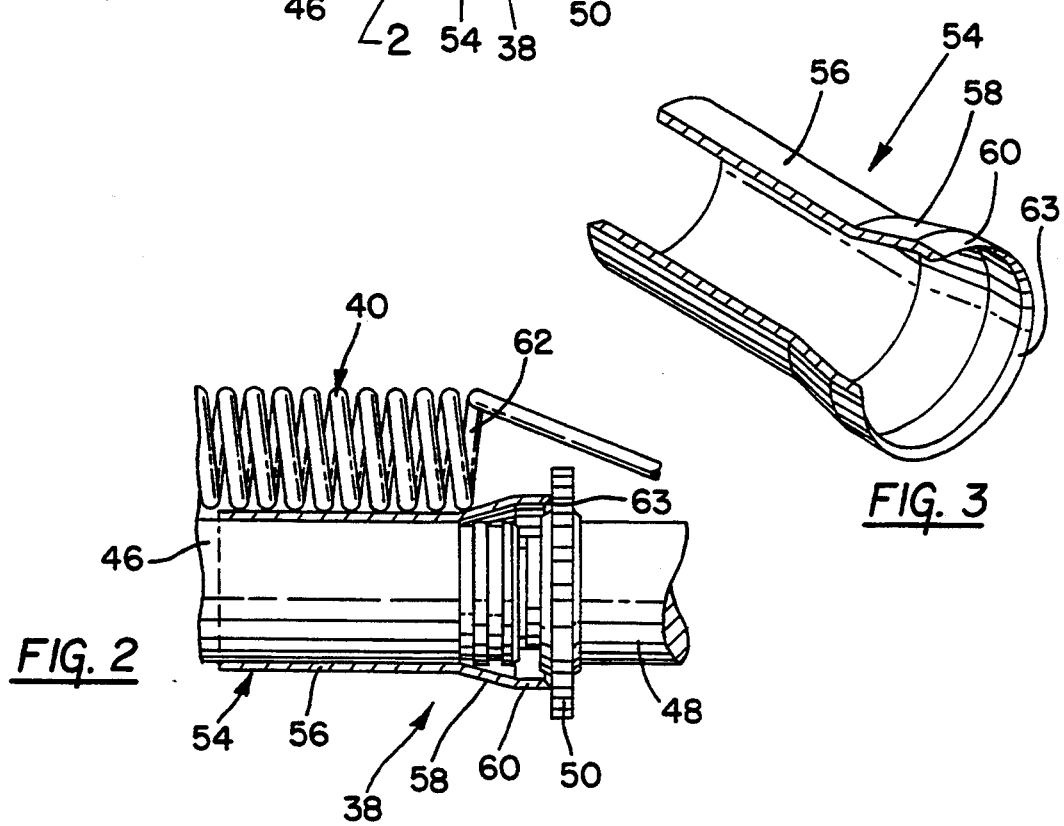
FIG. 2
FIG. 3

5,377,793

SLEEVE FOR A DRUM BRAKE ADJUSTER SCREW

BACKGROUND OF THE INVENTION

1. FIELD OF THE INVENTION

The present invention relates generally to automotive drum brakes, and in particular is concerned with a protective sleeve for an adjuster screw assembly of a drum brake.

2. DESCRIPTION OF THE RELATED ART

Adjuster screw assemblies for drum brakes are well-known. Typically, an adjuster screw assembly includes a pivot nut threaded onto a screw. A star wheel is attached to or formed on the screw opposite the pivot nut. An actuating mechanism rotates the star wheel and screw as brake shoe linings wear from use. As the screw is rotated, a greater length of threads is exposed to corrosive elements such as water, ice, mud, etc.

Exposure to these elements can result in components of an adjuster screw becoming corroded, particularly at the point where the screw enters the nut, and thus inoperative. Traditionally, grease has been used to protect the screw and prevent corrosion. Over time, however, grease on the screw can wash away or chemically break down due to high temperatures. Corrosion can occur as moisture combines with lining dust and dirt that collect on the threads.

It is desirable to protect the adjuster screw assembly from corrosion. Furthermore, it is desirable to provide an economical solution to possible corrosion which can be incorporated into conventional adjuster screw assemblies.

SUMMARY OF THE INVENTION

The present invention includes a sleeve for shielding an adjuster screw of a drum brake from corrosive elements. The sleeve is economical to manufacture and can be incorporated into conventional adjuster screw assemblies. The sleeve does not interfere with other parts of a brake assembly and does not substantially increase the torque required to turn a star wheel of an adjuster screw.

In a preferred embodiment, an automotive drum brake assembly includes first and second brake shoes mounted on a backing plate. A wheel cylinder for braking actuation is mounted between the brake shoes. An adjuster screw assembly is held between the brake shoes by an adjuster spring. The adjuster screw assembly includes a pivot nut threaded onto an adjuster screw. In one embodiment, a sleeve includes a first portion slidably mounted on the pivot nut, a second portion covering the screw threads and a third portion opposite the pivot nut. The second portion, preferably formed as a frustoconical ramp, is slid by the adjuster spring to travel with the adjuster screw as it unthreads from the pivot nut, thereby shielding threads from corrosive elements.

BRIEF DESCRIPTION OF THE DRAWINGS

FIG. 1 is an elevational view of a drum brake assembly incorporating a protective sleeve on an adjuster screw assembly according to the present invention.

FIG. 2 is an enlarged view of the circled portion of the adjuster screw assembly of FIG. 1 illustrating a right-most coil of an adjuster spring pushing against a ramp portion of the sleeve.

FIG. 3 is a sectional perspective view of the sleeve of FIGS. 1 and 2.

DETAILED DESCRIPTION OF THE PREFERRED EMBODIMENTS

Figure 5:
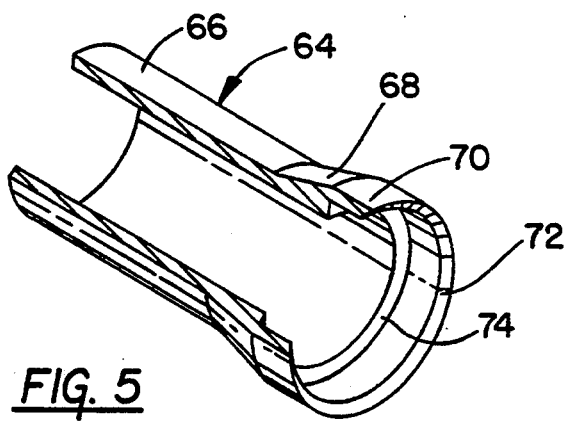
FIG. 5 is a sectional perspective view of the sleeve of FIG. 4.

A drum brake assembly indicated generally at 10 in FIG. 1 includes a drum 12 fixedly connected to a wheel (not illustrated) of a vehicle. A backing plate 14 is fixedly connected to an axle flange (not illustrated) of the wheel. A wheel cylinder 16 (commonly referred to as a brake cylinder) is mounted on an upper portion of the backing plate 14. Internal pistons (not illustrated) of the wheel cylinder 16 are in contact with brake shoe assemblies 18 and 20. Each assembly 18, 20 includes a rim 22 for supporting a brake lining 24 and a web 26 generally perpendicular with the rim 22.

An anchor pin 28 is secured to the backing plate 14. Upper ends of the brake shoe assemblies 18, 20 are pivotally mounted on the anchor pin 28. Springs 30 and 32 retain shoe assemblies 18 and 20, respectively, on the backing plate 14. Retraction springs 34 and 36 hold the shoe assemblies 18 and 20, respectively, in engagement with the wheel cylinder 16.

An adjuster screw assembly 38 (also known as an adjuster strut) is mounted between the lower ends of the brake shoe assemblies 18 and 20. An adjuster spring 40 pulls the lower ends of the shoes assemblies 18, 20 towards one another to hold the adjuster screw assembly 38 in place. In the embodiment of FIG. 1, a spreader bar 42 is placed between the shoe assemblies 18, 20 to provide a park brake actuator.

The adjuster screw assembly 38 includes a pivot nut 46 having internal threads mated to external threads of a screw 48. A notched star wheel 50 formed on the screw 48 opposite the pivot nut 46 is rotated as needed by an adjuster actuating mechanism 52 in a well-known manner.

A sleeve, indicated generally at 54 and illustrated best in FIGS. 2 and 3 is slid over the pivot nut 46 into contact with the star wheel 50. The sleeve 54 is a tubular member preferably formed from a metal such as aluminum, or polytetrafluoroethylene or a high temperature plastic. The sleeve 54 includes a first portion 56 having an inner diameter complementary to the outer diameter of the pivot nut 46. A second or frustoconical ramp portion 58 flares outwardly to a third portion 60 of the sleeve 54. Preferably, the outer diameter of the third portion 60 is less than the diameter of the star wheel 50. The increasing diameter of the ramp portion 58 is preselected to engage at least the right-most coil 62 of the adjuster spring 40. If desired, a chamfer 63 can be formed in the inner diameter of the third portion 60 adjacent the star wheel 50.

In operation, the actuating mechanism 52 rotates the star wheel 50 and screw 48 to unthread the screw 48 away from the pivot nut 46 and maintain desired positions of the shoe assemblies 18, 20 as the linings 24 wear from use. As the screw 48 unthreads from the pivot nut 46, a greater length of threads is exposed to corrosive elements such as water, ice, mud etc. However, sleeve 54 shields the portion of the screw 48 between the star wheel 50 and the pivot nut 46 from corrosive elements.

As a greater length of the screw 48 is unthreaded from the pivot nut 46, the sleeve 54 is forced to the right as viewed in FIGS. 1 and 2 by the right-most coil 62 of adjuster spring 40 to maintain contact with the star wheel 50. In this manner, the screw 48 is covered during the entire life of the linings 24. Grease on the screw 48 is shielded and corrosive elements are substantially prevented from reaching the screw 48.

Figure 4:
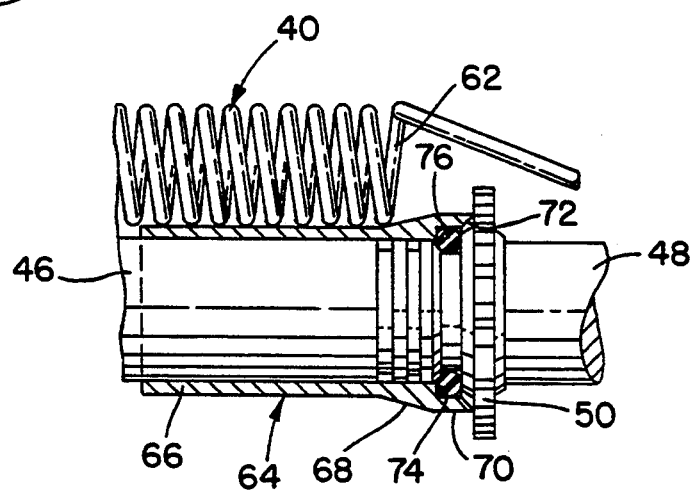
FIG. 4 is an enlarged sectional view of a second embodiment of the present sleeve illustrating a chamfer, a counterbore, and an O-ring seated in the counterbore.

A second embodiment of the present protective sleeve is indicated generally at 64 in FIGS. 4 and 5. The sleeve 64 includes first, second and third portions, 66, 68 and 70, respectively, having outer diameters similar to first, second and third portions, 56, 58 and 60, respectively. A chamfer 72 and a counterbore 74 are provided at the inner diameter of the third portion 70 adjacent the star wheel 50. The chamfer 72 reduces the torque on the star wheel 50 and provides drainage. The counterbore 74 provides clearance and a mounting surface for an optional seal 76 illustrated as an O-ring.

Figure 7:
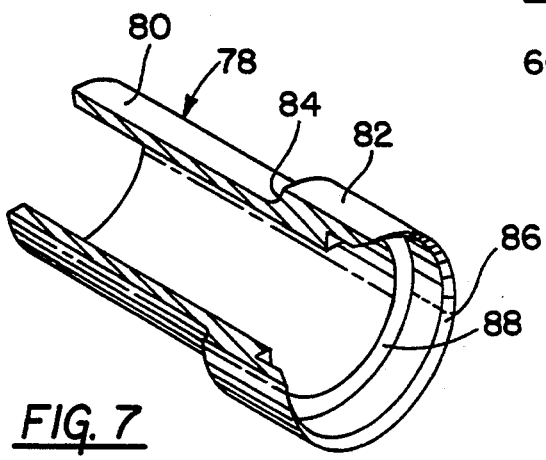
FIG. 7 is a sectional perspective view of the sleeve of FIG. 6.
Figure 6:
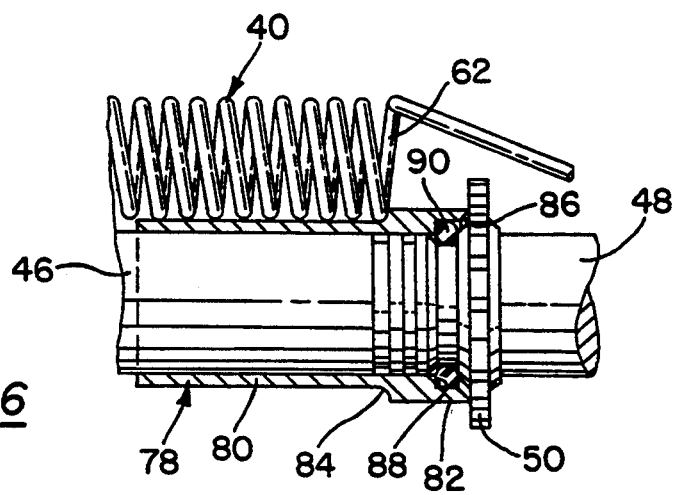
FIG. 6 is an enlarged sectional view of a third embodiment of the present sleeve illustrating a positive locator formed as an annular seat at the intersection of first and second positions of the sleeve.

A third embodiment of the present protective sleeve is indicated generally at 78 in FIGS. 6 and 7. The sleeve 78 includes a first portion 80 having an inner diameter complementary to the outer diameter of the pivot nut 46. A second portion 82 has an outer diameter greater than the outer diameter of the first portion 80 but preferably less than the diameter of the star wheel 50. A positive locator 84 for right-most coil 62 is provided at the intersection of the first portion 80 and the second portion 82. In the embodiment illustrated in FIGS. 6 and 7, the locator 84 is in the form of an annular seat. However, other configurations on the outer surface of sleeve 78 are easily envisioned. A chamber 86, counterbore 88 and optional seal 90 are provided at the inner diameter of the second portion 82 adjacent the star wheel 50. The second portion 82 provides a barrier to deter contamination of the threads on the screw 48.

Although the present invention has been described with reference to preferred embodiments, workers skilled in the art will recognize that changes may be made in form and detail without departing from the spirit and scope of the invention.

We claim:

1. An automotive drum brake assembly, comprising:
   (a) a backing plate;
   (b) brake shoe assemblies mounted on the backing plate for guided braking movement;
   (c) a wheel cylinder for braking actuation of the brake shoe assemblies; and
   (d) an adjuster screw assembly for maintaining desired positions of the brake shoe assemblies, the adjuster screw assembly including
   (i) a pivot nut,
   (ii) a screw threadingly mated on to the pivot nut,
   (iii) means for rotating the screw as the brake shoe assemblies wear,
   (iv) an adjuster spring connected to each brake shoe assembly adjacent the pivot nut and screw, and
   (v) a sleeve covering a portion of the screw unthreaded from the pivot nut, the sleeve having a portion of sufficient diameter to contact the adjuster spring and, responsive to said contact, is slid to an extended position as the screw is unthreaded from the pivot nut.

2. The drum brake assembly specified in claim 1 wherein the sleeve includes:
   (a) a first portion slidably mounted on the pivot nut;
   (b) a third portion extending to an end of the screw opposite the pivot nut; and
   (c) a second ramp portion having an increasing diameter connecting the first portion with the third portion.

3. The drum brake assembly specified in claim 2 wherein the ramp portion is frustoconical.

4. The drum brake assembly specified in claim 1 wherein an end of the sleeve opposite the pivot nut includes a counterbore.

5. The drum brake assembly specified in claim 4 wherein a seal is seated in the counterbore.

6. The drum brake assembly specified in claim 1 wherein the sleeve includes:
   (a) a first portion slidably mounted on the pivot nut;
   (b) a second portion extending to an end of the screw opposite the pivot nut; and
   (c) a positive locator for the adjuster spring at the intersection of the first and second portions.

7. The drum brake assembly specified in claim 6 wherein the positive locator is an annular seat.

8. The drum brake assembly specified in claim 1 wherein the sleeve is formed from a metal.

9. The drum brake assembly specified in claim 8 wherein the metal is aluminum.

10. The drum brake assembly specified in claim 1 wherein the sleeve is formed from polytetrafluoroethylene.

11. The drum brake assembly specified in claim 1 wherein the sleeve is formed from plastic.

12. A self-adjusting vehicle drum brake comprising:
   (a) a backing plate;
   (b) first and second brake shoes mounted on the backing plate;
   (c) a wheel cylinder contacting the brake shoes;
   (d) an adjuster screw assembly positioned between the brake shoes, including a rotatable star wheel for extending a threaded screw of the adjuster screw assembly, thereby extending the distance between the brake shoes;
   (e) spring means for biasing the brake shoes toward one another to retain the adjuster screw assembly, and
   (f) a sleeve covering the screw of the adjuster screw assembly, the sleeve including a portion of sufficient diameter to engage the spring means so as to slide the sleeve on the adjuster screw assembly and cover the screw as the screw extends from the adjuster screw assembly.

13. The drum brake specified in claim 12 wherein:
   (a) the adjuster screw assembly includes a pivot nut threaded onto the screw;
   (b) the star wheel is attached to an end of the screw opposite the pivot nut; and
   (c) the sleeve includes a first portion covering the pivot nut, a second ramp portion covering an exposed length of the screw, and a third portion adjacent the star wheel.

14. The drum brake specified in claim 13 wherein the second ramp portion is frustoconical.

15. The drum brake specified in claim 13 wherein an end of the third portion adjacent the star wheel includes a counterbore.

16. The drum brake specified in claim 15 wherein a seal is seated in the counterbore.

17. The drum brake specified in claim 12 wherein:
(a) the adjuster screw assembly includes a pivot nut threaded onto the screw;
(b) the star wheel is attached to an end of the screw opposite the pivot nut; and
(c) the sleeve includes a positive locator for the spring means formed on an outer surface of the sleeve.

18. The drum brake specified in claim 17 wherein the positive locator is a spring seat.

* * * * *